United States Patent [19] [11] 3,769,125
Bethge [45] Oct. 30, 1973

[54] METHOD FOR EMPLACING FILAMENT-SHAPED MATERIALS INTO THERMOPLASTIC MATERIALS AND PRODUCTS PRODUCED THEREBY

[76] Inventor: Walther Bethge, CH 4053 Bruderholzstr., Basel, Switzerland

[22] Filed: Feb. 24, 1971

[21] Appl. No.: 118,226

Related U.S. Application Data

[62] Division of Ser. No. 730,236, May 20, 1968, Pat. No. 3,635,777.

[30] Foreign Application Priority Data

May 20, 1967 Germany................... P 92 63 039.2

[52] U.S. Cl.................. 156/166, 156/176, 156/272
[51] Int. Cl........................................................ B32b
[58] Field of Search...................... 156/72, 285, 166, 156/435, 497, 176, 177, 178, 167, 272

[56] References Cited
UNITED STATES PATENTS
3,278,363  10/1966  Couquet .............................. 156/72
3,580,761  5/1971   Boultinghouse ..................... 156/72

Primary Examiner—William J. Van Balen
Attorney—Jacobi and Davidson

[57] ABSTRACT

Apparatus and techniques for inlaying or emplacing filament-shaped materials such as wires or the like into a thermoplastic base material wherein the thermoplastic base material is heated to locally and temporarily soften the same following which the filament-shaped material is impressed thereinto. The apparatus includes a distributor having guide means thereon which receives the filament-shaped material from a source of the same, the lower portion of the guide means defining a sliding foot which is heated to soften the base material immediately before impressing the same with the filament-shaped material. The distributor is positioned at an angle with respect to the upper surface of the base material, the inclination of which may be adjusted to maintain the sliding foot portion in alignment with an axis of rotation about which the distributor may be turned 180 degrees for reverse movement of the apparatus. The base material is supported in a manner whereby it may be offset step-wise on reversal of the distributor. Sensing means are provided to automatically raise and lower the sliding foot portion of the distributor in response to changes in the level of the upper surface of the base portion. The distributor may be lifted and latched in a position spaced from the base material during temporary interruptions in emplacing the filament-shaped material into the base material.

5 Claims, 9 Drawing Figures

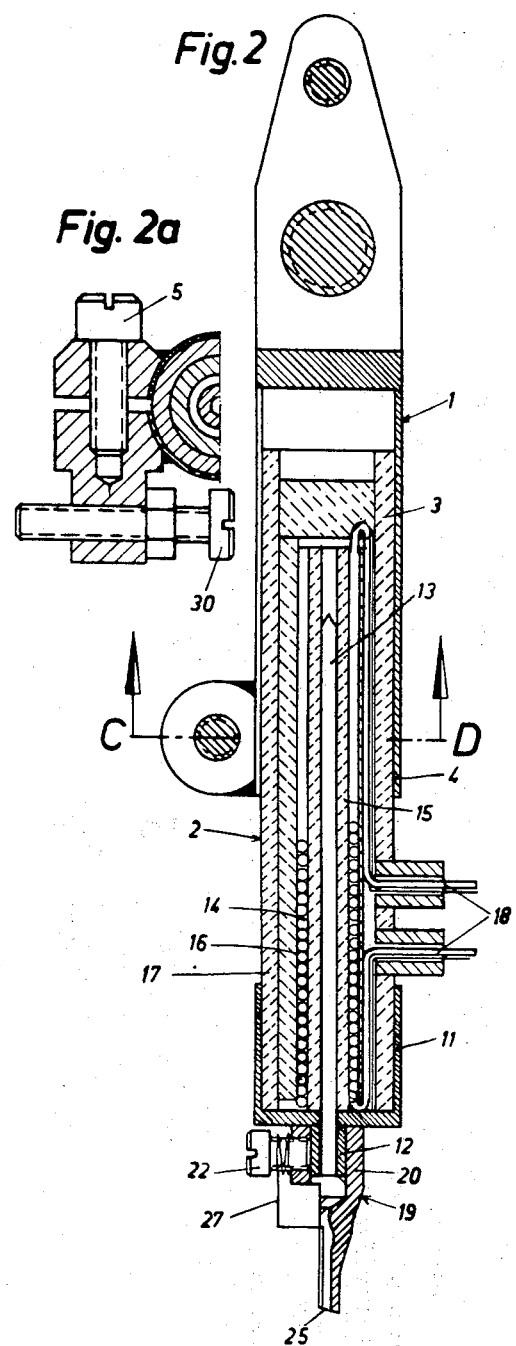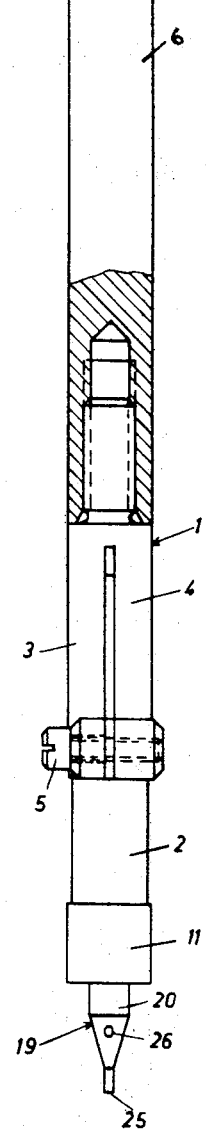

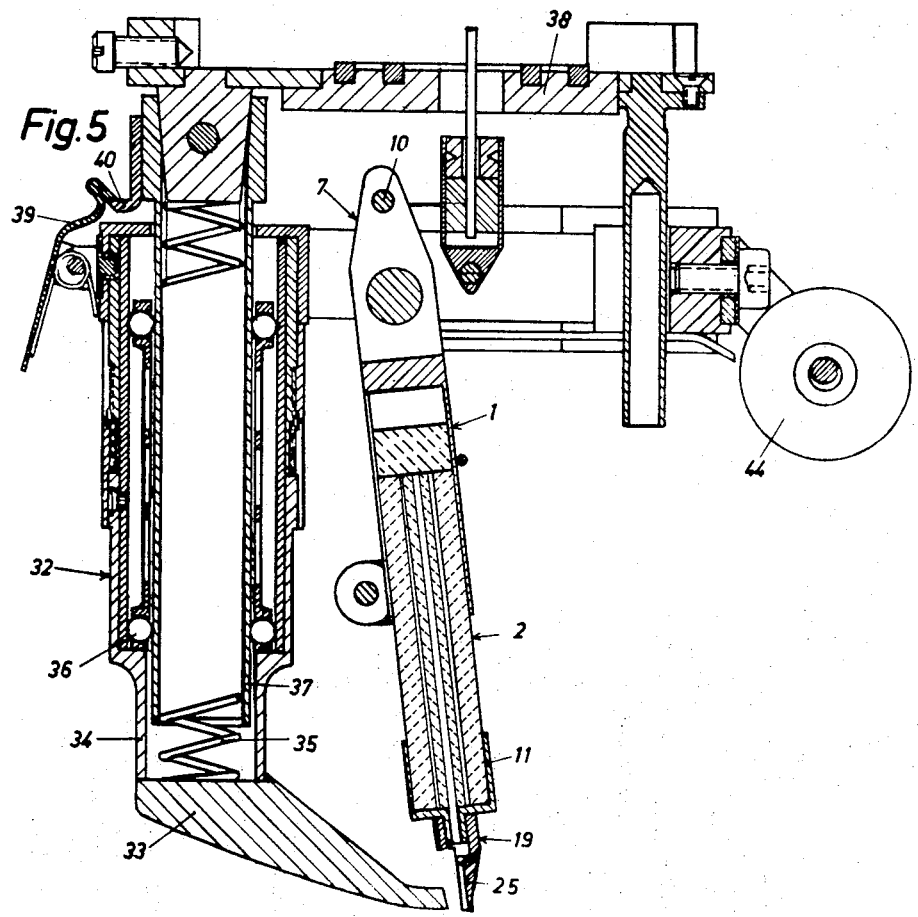
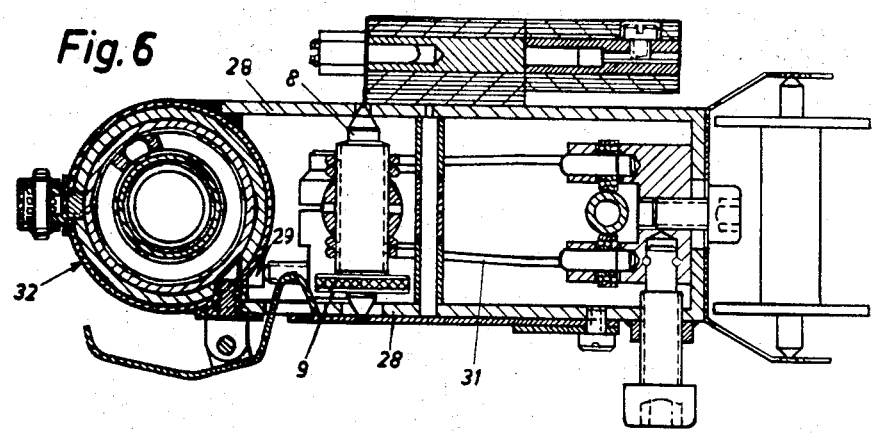

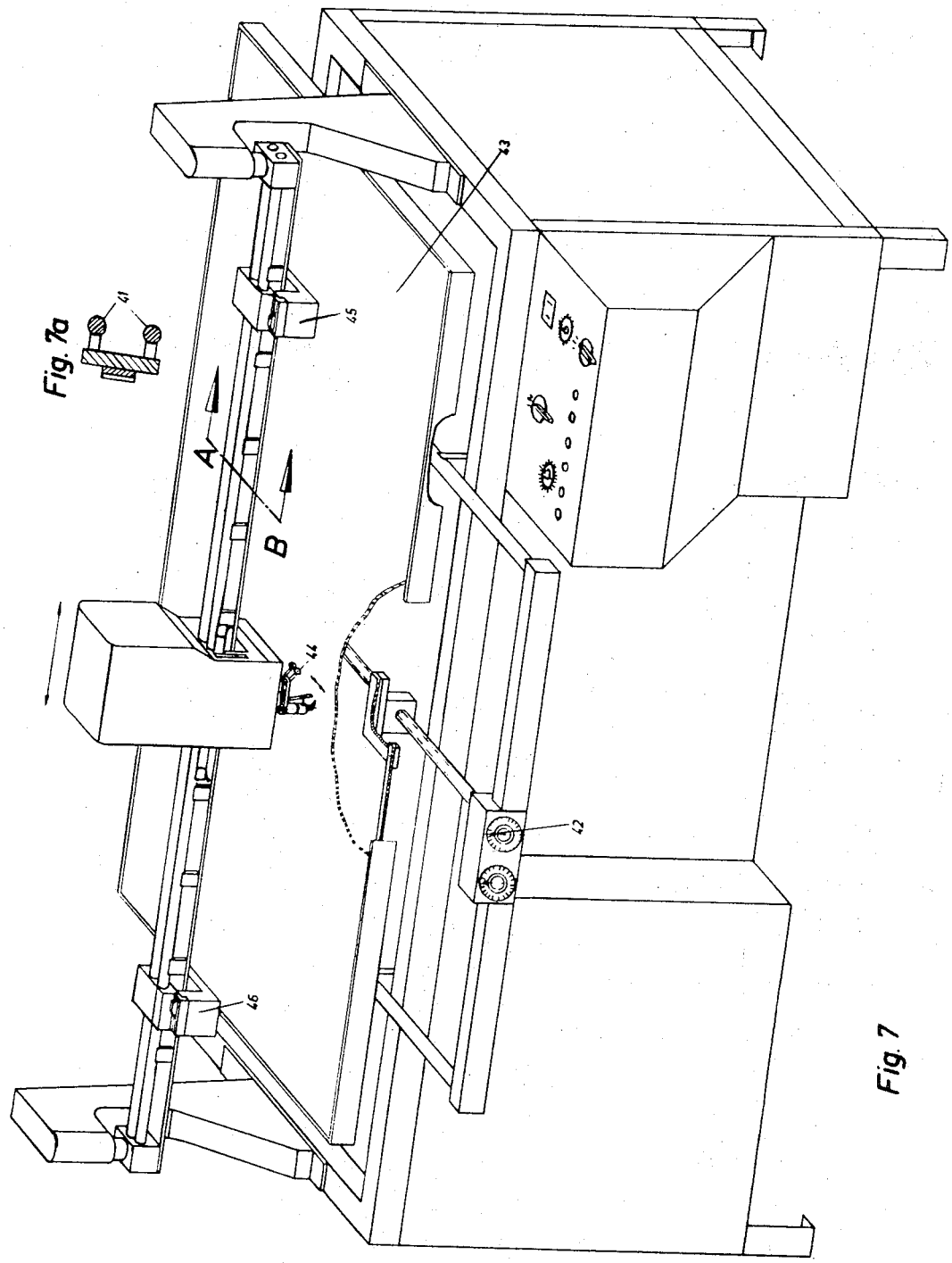

METHOD FOR EMPLACING FILAMENT-SHAPED MATERIALS INTO THERMOPLASTIC MATERIALS AND PRODUCTS PRODUCED THEREBY

This application is a divisional of applicant's co-pending application, U.S. Ser. No. 730,236, filed May 20, 1968 and entitled 'APPARATUS FOR EMPLACING FILAMENT-SHAPED MATERIALS INTO THERMOPLASTIC MATERIALS, METHOD FOR USING SAID APPARATUS AND PRODUCTS PRODUCED THEREBY', now U.S. Pat. No. 3,635,777.

This invention is directed to apparatus for emplacing filament-shaped material into thermoplastic base materials, methods for using the apparatus and products produced thereby and is related more particularly to the production of a product having inlaid filament-shaped material such as a wire by locally and temporarily softening the thermoplastic base material immediately in advance of impressing the same with the filament-shaped material.

Various applications, particularly those involved in the production of heat-generating, current-conducting or signal-conducting products, require that filamentary or strip materials of any desired shape, such as, for example, wires, strands, or strips, be emplaced or inlaid into a carrier base material in a plurality of side-by-side paths. The production of such articles may be carried out in a number of different ways, although there are not techniques or devices currently available which are capable of substantially completely automatic and uniform operation in a simple and inexpensive manner.

Thus, it is a primary object of the instant invention to provide methods and means for producing articles of the type described but which permit the implacement or inlaying of filament-shaped materials into a base material in a particularly efficient and high-speed manner. Moreover, the instant inventive concepts provide for the production of articles having inlaid filament-shaped materials in a manner which may be substantially completely automated, while having great versatility to fabricate products having substantially different arrangements of the inlaid material depending upon the particular application for which such products are to be used. Thus, the instant invention provides an apparatus, and a method of using the same, wherein a filament-shaped material can be emplaced in a thermoplastic base material in a plurality of generally parallel straight paths, with the filament-shaped material, if desired, being laterally offset in each path to provide a wavy arrangement and, also, with the waves in each path being longitudinally offset with respect to each other, if desired.

Yet another object of the instant invention is the provision of a method and means for emplacing filament-shaped material into a thermoplastic base material wherein the surface of the base material is continuously monitored and the means for emplacing the filament-shaped material is automatically raised or lowered in response to changes in the level of the surface of the base material.

A still further object of this invention is the provision of an apparatus, and techniques for using the same, wherein the filament-shaped material is carried along a predetermined primary direction of travel and impressed into a base material therebeneath immediately after temporarily softening the base material, and the primary direction of travel is reversed at the end of a forward pass, with the base material being laterally offset before the filament-shaped material is carried in the reverse direction to space juxtaposed portions of the filament-shaped material from each other. In this regard, the means for distributing the filament-shaped material according to the instant inventive concepts is maintained at an angle with respect to the level of the surface of the base material, and means are provided for adjusting this angle, as desired. Additionally, this adjusting means may serve to insure that the portion of the distributing means which guides the filament-shaped material is aligned with the axis of rotation around which the distributing means is rotated for reverse movement.

In general, it is a basic objective of this invention to provide a method and means for emplacing or inlaying filament-shaped materials into a thermoplastic base material which is simple and efficient in operation, with the apparatus being sturdy and durable in construction and highly reliable and efficient in use.

Other and further objects reside in the particular manipulative steps defined hereinafter as well as the arrangement of parts and features of construction of the apparatus and the products produced. Still other objects will in part be obvious and in part be pointed out as the description of the invention proceeds and as shown in the accompanying drawings wherein:

FIG. 1 shows a rear elevational view, partly in cross-section, and somewhat enlarged, of a distributor for emplacing filament-shaped materials into a thermoplastic base material according to the instant inventive concepts;

FIG. 2 is a side view, partly in cross-section, of a somewhat modified distributor mounted in a holding means suitable for automatic operation;

FIG. 2a is a transverse cross-sectional view taken substantially along lines C–D of FIG. 2;

FIG. 5 is a side view, partly in cross-section, of the emplacement apparatus of this invention;

FIG. 6 is a top plan view, partly in cross-section, of the emplacement apparatus shown in FIG. 5;

FIG. 7 is a schematic perspective view of the emplacement apparatus, to a reduced scale, showing the same in use; and FIG. 7a is a fragmentary cross-sectional view of the guide tracks for the emplacement apparatus taken substantially along lines A–B of FIG. 7.

Like reference characters refer to like parts throughout the several views of the drawings.

Figure 3:
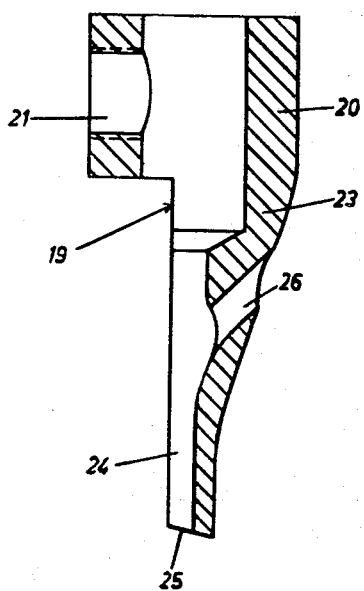
FIG. 3 is an enlarged longitudinal cross-sectional view through the strand or filament guide means of the distributor of this invention.
Figure 4:
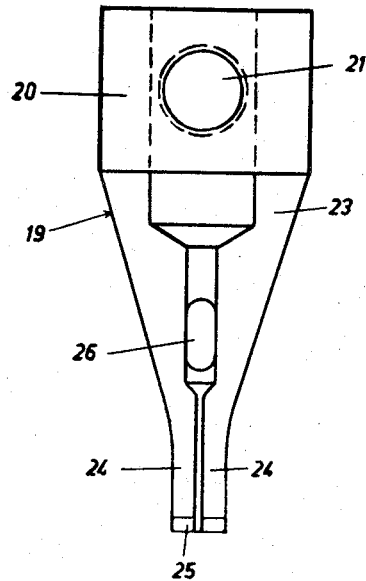
FIG. 4 is a front elevational view of the guide means of FIG. 3.

The invention in general, as will be seen from the accompanying drawings, is directed to an apparatus for emplacing or inlaying a filament-shaped material into a carrier base made of a thermoplastic or heat-softenable plastic material or into a layer of such a thermoplastic material coated on a carrier base. As the distributor slides over the base material, the surface of the base material is locally and temporarily softened by means of feeding heat thereto at a level sufficient to permit continuous emplacement into the softened mass of the filamentary or strand-like material which is reeled from a spool defining a source of the same, the path of travel of the distributor being prearranged as desired as will be explained in more detail hereinafter. In this manner, the filament-shaped material will be bonded directly to the base material in the predetermined arrangement upon cooling of the locally and surface-heated thermoplastic material which takes place immediately after inlaying of the filament-shaped material.

Basically, the apparatus of this invention comprises a distributing means which contains a minimally-sized heating means, the upper end of which is clamped into a cartridge-shaped holder or mounting support. A heat-conducting shaft or pin protrudes from the bottom of the heating means and a filament guide means is rigidly clamped thereto.

The major portion of the filament guide means possesses a U-shaped profile below the part which is clamped in heat-receiving relationship to the heating means. The legs of the U-shaped profile point in the primary direction of travel of the distributor and the major portion of the filament guide means is tapered toward its lower end which defines a suitably shaped sliding foot portion. The U-shaped portion is provided with an ear having a guide opening defined therethrough which slopes downwardly into the slot defined between the legs of the U-shaped portion.

A further feature of the instant invention resides in the provision of a spring-clamping means which secures the distributor to a support transversely to its longitudinal axis and counter to the placement direction, in a manner such that the longitudinal axis forms, preferably, an angle of about 80° with respect to the upper surface of the base material during the placement operation. The sliding foot portion of the filament guide means is arranged to lie in the center of a rotational axis around which the mounting support may be rotated by 180° to reverse the direction of placement of the filament-shaped material.

Another feature of the instant invention is the provision of regulating means mounted vertically with respect to the upper surface of the base material, the regulating means being resiliently pressed into engagement with the upper surface of the base material with the distributor being operatively secured to the regulating means in a manner to raise and lower the sliding foot portion of the distributor in response to changes in the height of the regulating means caused by variations in the level of the upper surface of the base material thereby insuring that the sliding foot portion of the distributor retains a constant relationship with respect to the upper surface of the base material even when the upper surface of the base material is uneven.

Additionally, the apparatus of the instant invention is provided with a drive means which is capable of functioning in a forward and reverse direction to move the distributing means along a guide track with separate drives being provided at the end of each path of travel for rotating the apparatus 180°. Further, an additional drive means is provided to laterally displace or offset the base material with respect to the primary direction of travel of the distributor between each forward and reverse run.

When it is desired that the filament-shaped material be emplaced while it is not in completely stretched condition, the placement apparatus can be moved by suitable drive means to, for example, form waves with the filament-shaped material. This can be effected by means of an auxiliary drive which is activated by the main distributor drive means to move the placement apparatus transversely to the main or primary direction of travel as it moves along a particular run. Additionally, a further auxiliary drive means, which also can be activated by the main distributor drive means, can move the placement apparatus slowly forward and backward in its directional course thereby achieving a displacement or variation of the pulses of a wave in one run relative to the pulses of the waves in an adjacent run and/or a variation in the length or amplitude of the waves.

The method of the instant invention provides for the use of an apparatus of the type described to emplace or inlay a strand, filamentary or strip-shaped material into a base material which may be softened by the application of a local and temporary heat.

According to this invention, the operation of the apparatus can be automatically controlled electrically with respect to its forward and backward movement, the displacement of the base material between each forward and backward run, and the respective reversal of the distributing means by 180° at the end of each run.

The technique for operating the apparatus of this invention provides for feeding a filament, strand or strip-like material which is unreeled from a spool revolving solely by means of the pull on the filament-shaped material, with the filament-shaped material passing from the spool through the guide opening defined in the guide means angularly and downwardly into a slot provided by the guide means as the apparatus is moved along a guide track. The spool of filament-shaped material is preferably carried by the apparatus above the guide means. As the apparatus moves along its runs, the filament-shaped material emerges from the sliding foot portion of the guiding means and is pressed into the surface of the base material which has been locally and temporarily softened by virtue of heat emanating from the heating member which is transferred to the sliding foot portion of the guide means.

Finally, the instant inventive concepts are directed to the products which are formed utilizing the apparatus according to the methods of the instant invention. These products may be, for example, heating means such as area heaters having inlaid, relatively thin heating wires or the like. The method is particularly applicable in the production of heating plates having a laminated glass construction wherein the very thin heating wires are superficially laid into the laminated glass foil. Moreover, the method of this invention permits production of so-called alarm plates in a reliable and economical fashion.

For a further understanding of the instant inventive concepts, reference is now made to the accompanying drawings.

The distributing means is designated generally by the reference numeral 1 and is an essential part of the apparatus for emplacing filament-shaped materials into a thermoplastically softenable base material. The distributor 1 includes a cylindrically-shaped heating means 2 of minimal dimensions, with an unheated upper half 3 rigidly clamped into a cartridge-shaped holding means 4.

For this purpose, the cartridge-shaped mounting of holding means 4 is slit longitudinally on one side and equipped with a screw 5 to securely hold the heating means 2 therewithin. Note particularly FIG. 2a.

At the end of the holding means 4 lying opposite heating means 2, a penholder-like handle 6 may be attached in the event that is desired that the emplacement operations of the distributor 1 be performed manually. Note FIG. 1. The current for heating means 2 can be conducted through the handle 6.

For purposes of mechanical or automatic emplacement, reference is made to FIG. 2, wherein the portion of the holding means 4 lying opposite the heating means 2 terminates in a bolt or stud 7 which, for its major part, is slit longitudinally into two equal halves and which is bounded by lateral flanks parallel thereto. The bolt 7 is provided with a transverse bore at the height of the flanks which is equipped with a thread for the purpose of receiving a tapered propellor shaft 8 (FIG. 6) which has an adjusting means in the form of a screw 9 by means of which the distributor 1 can be adjusted laterally in the emplacement apparatus. The tapered end portion of the bolt 7 may contain an additional transverse threaded bore for receiving a set screw or clamping screw 10 for the purpose of locking the distributor 1 in place in laterally adjusted position.

The heating means 2 is preferably constructed of ceramic material and the portion of the heating means 2 which protrudes downwardly from the cartridge-shaped part of the holder 4 is capped by a casing head 11 which is pierced axially and which is equipped with a cylindrical projection 12 for the purpose of receiving the end portion of shaft 13 having high heat conductivity and extending downwardly from heating means 2.

The heating coils 14 of the quickly-reacting heating means 2 are located primarily on the lower half of a thin ceramic tube 15 which in its cavity contains the shaft 13 for axial heat transfer to the filament guide means in a manner to be described in more detail hereinafter. For purposes of increasing radial thermal-insulation, a ceramic covering tube 16 is placed on top of the heating coils 14 with a further ceramic tube 17 superimposed upon the covering tube 16. Leads or conductors 18 feed current through two lateral openings in the tube 17 to the heating coils 14.

The projection 12 of the casing head 11, which receives the shaft 13, is used for attachment of the filament guide means 19. For this purpose, the upper portion of the filament guide means 19 is axially or longitudinally bored and has a transverse threaded opening 21 for receiving a clamping screw 22 to secure the filament guide means 19 to the projection 12. A U-shaped profile main portion 23 of the filament guide means 19 has its leg portions 24 pointing forwardly, that is, in the main direction of travel which the distributor will take during the emplacement operation, this U-shaped profile portion 23 of the filament guide means adjoining the upper portion 20, with the main portion 23 tapering inwardly and downwardly toward a suitably shaped free or unattached sliding foot portion 25. The U-shaped profile portion of the filament guide means 19 is equipped with an ear having a guide opening 26 therethrough which extends obliquely downwardly into the slot defined between the leg portions 24 of the filament guide means 19. As shown in FIG. 2 a small spring 27 is anchored to the clamping screw 22 at one end, the opposite or free end of the spring 27 extending into the slot defined by the U-shaped portion of the filament guide means 19 to a point below the location at which the guide opening 26 communicates with the aforementioned slot to thereby improve the guiding action provided for the filament-shaped material as it is being emplaced.

For purposes of emplacement, the distributor 1 must be placed into a pull or drag position relative to the surface of the base material in such a manner as to arrange the longitudinal axis of the distributor 1 and the plane of the upper surface of the base material at an angle of approximately 80°. This is accomplished by suitably suspending the distributor 1 in the manner to be described hereinafter. By means of the propellor shaft 8, the adjusting screw 9 and the clamping or locking screw 10, the distributor 1 is mounted between a pair of guide tracks of a supporting means 28 of the emplacement apparatus in such a manner as to prevent any undesirable lateral movement of the distributor 1. A projection 29 (FIG. 6) cooperates with a set screw 30 (FIG. 2a) which is carried by the clamping means for the cartridge-shaped portion of the holder 4 to permit any desired adjustment of the inclination of the distributor 1 and centering of the sliding foot portion 25 of the filament guide means 19 with respect to the rotational axis around which the emplacement apparatus with the distributor must be swung by 180° for forward and backward runs of the same. A spring 31 normally urges the distributor 1 into its directional course by means of which the distributor 1 raises or lowers itself more or less depending upon the depth adjustment of the sliding foot portion 25 of the filament guide means 19 and the degree of softening of the base material.

Since it is essential that the sliding foot portion 25 of the filament guide means 19 does not vary its position in relation to the depositing of the filament on the base material, the emplacement apparatus is equipped with a regulating means 32 which functions to raise or lower the supporting means 28 carrying the distributor 1 depending upon the characteristics of the base material. For that purpose, the regulating means 32 is provided with a sensing foot 33 which is mounted on the lower end of a sliding element 34 and which is constantly pressed by a spiral spring 35 into contact with the upper surface of the base material. The sliding element 34 is rigidly connected to the supporting means 28 whereby the distributor 1 is easily guided for parallel displacement by means of a bearing or ball box 36 interposed between the sliding element 34 and a pipe member 37.

Finally, the emplacement apparatus is provided with a centering base 38 which covers the upper part and which, in the event of temporary interruption in the laying operation, is provided with a lifting member in order to be able to raise the entire apparatus. Moreover, the regulating means 32 with supporting means 28 and distributor 1 can be locked in its uppermost position by means of a snap joint 39 behind a notch 40.

Referring to FIG. 7, the emplacement apparatus is equipped with an electrically regulatable drive (not shown) for forward and reverse movement along a guide track 41. An additional drive means (not shown) is operatively associated with the apparatus for turning the same by 180° at the end of each pass. A further adjustable drive means 42 is provided for moving base means 43 by a predetermined amount at the same time that the emplacement apparatus is swung around between forward and reverse runs of the main distributor drive means.

As mentioned previously, the emplacement apparatus of this invention is not only capable of laying a filament-shaped material in a stretched or taut condition, but by means of suitable serially switched drive means (not shown) the apparatus can periodically be moved to a slight extent transversely of its primary direction of travel in order to accomplish rectangular or wave-like emplacement of the filament-shaped material. Moreover, a further drive means (not shown), which may also derive its power from the main drive means or from the reversing drive means, may be employed to achieve, by means of a slight periodic forward and backward movement of the emplacement apparatus in the primary directional course, a displacement of adjacent wavey strands with respect to each other or a periodic increase or decrease of the length of the wave of the filament-shaped material which is laid by the device of this invention.

During the operation of the emplacement apparatus hereof, a strand or the like which unreels from the spool 44 located above the filament guide means 19 and mounted for rotation solely in response to a pull on the strand, is fed to the slot defined between the leg portions 24 of the U-profiled portion of the filament guide means 19 through the guide opening 26 traversing downwardly in an oblique direction. From there, the filament-shaped material emerges from the suitable shaped sliding foot portion 25 of the filament guide means 19 as the emplacement apparatus moves along the guide tracks 41, the filament-shaped material being pressed into the surface of the base material 43 which has been locally and temporarily softened by virtue of heat emanating from the heating means 2 and transferred to the base material from the terminal end of the sliding foot portion 25. Since the heat requirement not only depends upon the type of base material being utilized, but must also be raised to accommodate increasing emplacement speed, the apparatus provides a suitable control means (not shown) to correlate these functions thereby preventing excessive softening of the base material 43.

The emplacement apparatus is advantageously operated through an automatic control preferably electrical in nature, inasmuch as a definite sequence repeats itself periodically during functioning of the apparatus. The forward and reverse movement of the emplacement apparatus along the guide tracks 41 takes place by means of an electric motor (not shown) revolving means being installed above the emplacement apparatus. As soon as the apparatus touches an adjustable contact 45 at one end of the run, the main drive means switches itself off, a greatly geared-down reversing motor means (not shown) which is also installed above the emplacement apparatus, switches itself on and swings the apparatus around through an arc of 180° in a clockwise direction. At the same time, drive means 42 switches on thereby moving the base material 43 a short distance laterally of the primary direction of travel of the distributor over the base material. After reaching the predetermined positions, the reversing motor means, as well as the displacement drive means 42, switch themselves off and the main drive means switches itself on for counterclockwise revolutions, thereby reversing the primary direction of travel of the distributor over the base material. After reaching the terminal position in the reverse direction, the emplacement apparatus activates contact 46 which switches off the main driving means and switches on the reversing drive means for counterclockwise rotation turning the emplacement apparatus by 180° and again setting into operation base drive means 42 in order to displace the base means 43 laterally of the primary direction of travel of the distributor over the base material. As soon as this phase is ended, the main drive means again switches itself on for clockwise revolution and the described sequence of switching operations repeats itself. In this fashion, the emplacement apparatus can be kept in operation completely automatically and it is only necessary to control the heating means 2 and/or adjust the running speed of the main drive means to the optimum or desired condition in order to inlay the filament-shaped material in a continuous manner into the base material.

As mentioned previously, the emplacement apparatus is equipped with a lifting member which enables the sliding foot portion 25 of the distributor to be raised temporarily to interrupt the emplacement operation for a short interval. This phase of the operation may also be automatically provided for by suitable contacts (not shown) for example, lifting the filament-shaped material which is being inlaid over a strip-shaped conductor (not shown).

As will be readily recognized by those skilled in the art, it is feasible to provide for variations from the previously described embodiment. For example, a different form of guide track can be employed. Likewise, the transverse and/or pushing movement imparted to the apparatus during the emplacement operation can be produced in a different manner, for example, electromagnetically in the event that one is dealing with wavelike emplacement of heater wires, for instance, for heating plates.

From the foregoing, the use and operation of the device of the instant invention is believed to be apparent. Once again, the filament-shaped material, particularly, for example, an extremely thin wire, is unreeled from the spool 44 located above the filament guide means 19 and mounted for rotation in response to a pull on the material. The strand of filamentary material is then fed through the guide opening 26 to the slot in the U-shaped portion of the filament guide means passing downwardly in an oblique direction. From there, the strand emerges from the sliding foot portion 25 of the filament guide means 19 as the emplacement apparatus moves along its predetermined path, and is pressed into the surface of the base material 43 which has been locally and temporarily softened by virtue of heat from the sliding foot portion 25 of the filament guide means 19. The necessary heat requirement for softening the plastic base material 43 can be regulated depending upon the emplacement speed and the thermoplastic characteristics of the base material. The operational sequence of the apparatus can take place automatically by means of electrical controls in that the sequence recurs regularly. A contact 45 is activated at the end of the run-in of the emplacement apparatus along the guide tracks 41, this contact ending of the run-in by means of switching off the main drive means. At the same time the reversing motor is switched on for clockwise turning about 180° and the displacement drive means for the base material 43 is set into operation. After termination of the reversal phase and the displacement of the base means by one line, a further contact is activated in order to switch off the reversing motor and the displacement drive and switch on the main drive means for counterclockwise revolution. After reaching the terminal position in the reverse run, contact 46 is activated whereupon the counterclockwise revolutions of the main or distributor drive means are ended, the reversing motor is switched on for counterclockwise rotation of the apparatus by 180° and the displacement drive for the base means 43 is again set into operation to move the base means by one additional line. After termination of the reversal and displacement, a further contact is activated which switches off these drives and again switches on the main drive means for the forward run, thus starting a new and identical sequence. It is of course possible to adjust the speed involved in the reversal through the reversing drive means to correlate the same to the duration of displacing the base means 43. It is also possible to lift the emplacement apparatus automatically shortly before or shortly after reaching the terminal portion in either direction in order to transport it, for example, over subsequent conductors. Various types of products can be economically and advantageously produced by means of the above-described apparatus and techniques for operating the same, particularly products wherein very thin strands such as wires, etc., are emplaced within a base material for the production of an area heating means or heating plates.

From the foregoing, it is believed that the instant inventive concepts will be readily understood. Accordingly,

What is claimed is:

1. A method of continuously embedding a filament-shaped material in a thermoplastic base material comprising the steps of: withdrawing and continuously dispensing said filament-shaped material from a continuous source of material, guiding said filament-shaped material along a predetermined pattern with respect to said base material dispensed from a continuous source, heating said base immediately in front of said filament-shaped material as said material is dispensed to temporarily soften a localized zone, and pressing said filament-shaped material into said base material immediately after the heating of said base material at said localized zone so as to bond and embed thereto upon cooling said filament-shaped material, thereby continuously embedding said filament-shaped material in said base material in said pre-determined pattern and in a manner which substantially conforms said filament-shaped material to a plane substantially parallel to the plane of said base material.

2. The method of claim 1 wherein said base material is locally heated by contact with a heated guide element carrying said filament-shaped material, and said method further comprising the step of varying the quantity of heat provided to said heating element in response to variations in the speed of emplacing said filament-shaped material into said base material.

3. The method of claim 1 further comprising the steps of guiding said filament-shaped material along a forward primary direction of travel over said base material while locally heating said base material and pressing said filament-shaped material into said base material immediately thereafter, reversing the direction of travel of said filament-shaped material when it reaches a terminal position in the forward direction, laterally displacing said base material with respect to said primary direction of travel, guiding said filament-shaped material along a reverse primary direction of travel while locally heating said base material and pressing said filament-shaped material into said base material immediately thereafter reversing the direction of travel of said filament-shaped material when it reaches a terminal position in the reverse direction, again laterally displacing said base material with respect to said primary direction of travel, and repeating the foregoing sequence as desired.

4. Method according to claim 3, wherein the speed of reversing the direction of travel of said filament-shaped material is correlated with the speed of laterally displacing said base material with respect to said primary direction of travel.

5. Method according to claim 3, wherein said filament-shaped material is moved away from said base material before it reaches said terminal positions in said forward and reverse directions.

* * * * *